UNITED STATES PATENT OFFICE.

ANDREAS FARAGÓ, OF BUDAPEST, AUSTRIA-HUNGARY.

PROCESS FOR PREVENTING DECOMPOSITION OF HYDROGEN-PEROXID SOLUTIONS.

1,134,323.  Specification of Letters Patent.  Patented Apr. 6, 1915.

No Drawing.  Application filed April 20, 1914. Serial No. 833,306.

*To all whom it may concern:*

Be it known that I, Dr. ANDREAS FARAGÓ, residing at Budapest, in the Empire of Austria-Hungary, at the time at Berlin, Germany, have invented certain new and useful Improvements in Processes for Preventing Decomposition of Hydrogen-Peroxid solutions, of which the following is a specification.

The subject of the present invention is a process for preventing decomposition of hydrogen-peroxid solutions.

It has been discovered that hydrogen-peroxid solutions, which otherwise in any circumstances decompose by forming water and oxygen, do not suffer from decomposition in closed receptacles which contain oxygen under high pressure. This discovery forms the basis of the present invention, which essentially consists in saturating hydrogen-peroxid solutions with oxygen and subjecting the so-obtained solutions to high gas pressure in hermetically closed receptacles. These solutions remain permanently in this condition without decomposition and their content of hydrogen-peroxid undergoes no change whatever.

The process according to the present invention is based on the law of mass-action, according to which the increased concentration of one of the components of reaction alters the equilibrium of the reaction in the sense, that the concentration of the resulting product of reaction decreases to the minimum.

The process may be performed in various ways. It will only be necessary to take care that the hydrogen-peroxid solution, saturated under suitable pressure with oxygen, be forced under the same amount of pressure into a closed receptacle. Hydrogen-peroxid solution may then be drawn therefrom in any desired quantities.

According to one method of carrying out the process, which answers the purpose, the hydrogen-peroxid solution, after being saturated with oxygen is filled under pressure into siphon bottles.

The appliances to be used in the execution of both phases of the process, viz: the saturation and the filling are identical with those employed in the manufacture of soda water, with the exception however that their component parts are made of materials which do not catalyze the decomposition of hydrogen-peroxid solutions. The hydrogen-peroxid solution saturated with oxygen, may then be subjected to gaseous pressure without thereby affecting the nature of the present invention.

I claim:

A process of preventing the decomposition of hydrogen peroxid which consists in saturating the solution with oxygen then subjecting the said solution to high gaseous pressure in hermetically closed receptacles.

In testimony whereof I affix my signature in presence of two witnesses.

Dr. ANDREAS FARAGÓ.

Witnesses:
HENRY HASPER,
WOLDEMAR HAUPT.